Jan. 13, 1948.  R. B. MARSHALL  2,434,574
HEATING SYSTEM
Filed May 8, 1946  2 Sheets-Sheet 1

Inventor
RICHARD B. MARSHALL.
by [signature] Attys

Jan. 13, 1948. R. B. MARSHALL 2,434,574
HEATING SYSTEM
Filed May 8, 1946 2 Sheets-Sheet 2
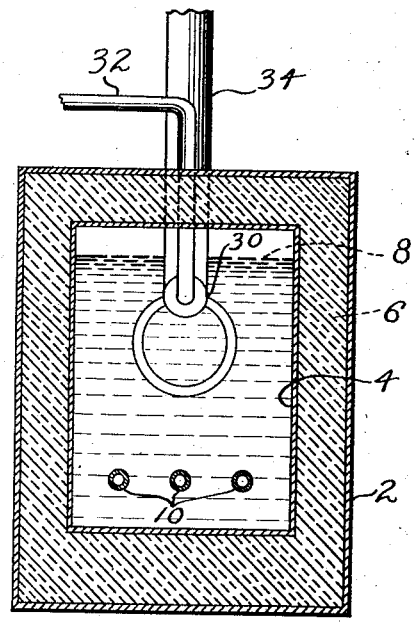
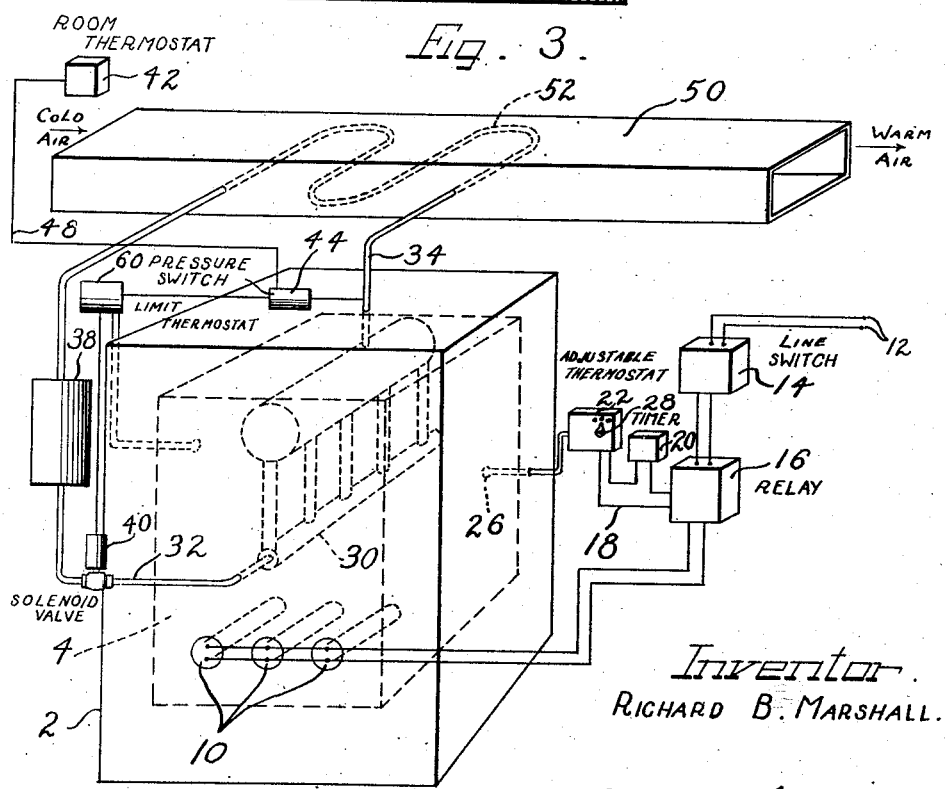
Inventor.
RICHARD B. MARSHALL.

Patented Jan. 13, 1948

2,434,574

UNITED STATES PATENT OFFICE 2,434,574

HEATING SYSTEM

Richard B. Marshall, Detroit, Mich., assignor to Electromaster, Inc., Detroit, Mich., a corporation of Michigan Application May 8, 1946, Serial No. 668,269

4 Claims. (Cl. 219—39)

This invention relates to a heating system and particularly to an improved method and apparatus for heating homes or buildings of similar size by electricity.

The use of electricity for domestic heating purposes has been widely advocated due to the cleanliness and susceptibility of control of electrical heating apparatus, but to date, large scale heating of homes and other small buildings has been a practical impossibility due to the fact that all of the available electrical generating equipment is already required to supply the normal peak power load incurred by present day uses of electricity independent of home heating. Accordingly, the wide scale application of electrical heating to homes would immediately exceed the peak power capacity of available generating equipment and thus the power companies are placed in the undesirable position of having to refuse to supply the additional power requirements for domestic electric heating, despite the obvious attraction of the unity power factor load inherent in electric heating.

In accordance with this invention, an improved method and apparatus for heating by electricity is provided which draws electric power only during certain predetermined periods of each day and hence the power demand periods of the heating apparatus may be timed to coincide with the off-peak power periods of the conventional power demands upon the generating system. For example, a heating system in accordance with this invention may be adjusted to draw power only between the hours of ten p. m. and seven a. m., which is a well recognized "off-peak" power period in all electrical generating systems. There is a large amount of generating capacity available for use during such off-peak power periods and a heating system embodying this invention provides a very desirable unity power factor load for the available generating capacity throughout the entire off-peak power period.

The heating system contemplated by this invention comprises an insulated boiler element defining a fluid storage chamber in which a fixed quantity of high boiling point, heat storing fluid is disposed. While several types of fluids of these properties are known in the art, this invention preferably utilizes a liquid known as diphenyl oxide or mixtures thereof such as that described in U. S. Patent No. 1,882,809, issued October 18, 1932, to John J. Grebe. The total heat input to the high temperature, heat storing fluid during the energization period of the electric heater provided for heating such fluid is proportioned to exceed the expected heat demands of the room area to be heated during the entire daily period, or in other words, over the entire twenty-four hours elapsing between the beginnings of the successive off-peak power periods.

While a variety of apparatus may be utilized to draw off heat from the electrically heated fluid in response to the recurring demands during the twenty-four hour period, this invention provides an unusually simple yet efficient heat transfer apparatus comprising a flash boiler disposed in heat transfer relationship to the electrically heated high temperature fluid. The steam output of the flash boiler is utilized in any conventional manner to heat the room area while the water input to the flash boiler is controlled in response to the temperature of the room area being heated.

Accordingly it is an object of this invention to provide an improved method and apparatus for electrically heating homes and other buildings of corresponding size.

A further object of this invention is to provide an improved method and apparatus for electric heating which is operable only during off-peak power periods of the generating system to which it is connected, thereby assuring that the peak-power generating capacity of such generating system need not be increased to accommodate the additional load represented by the electrical heating system.

A still further object of this invention is to provide an improved heating system wherein a fixed quantity of high boiling point, heat storing fluid is electrically heated to a sufficient degree during off-peak power periods to insure that the heat stored therein will exceed the expected heat demands of the room area to be heated over an entire daily period.

Another object of this invention is to provide an improved heating apparatus for heating and storing of a fixed quantity of high boiling point, heat storing fluid and providing a simple and efficient heat transfer unit for transferring the heat from the high temperature fluid to a room area in response to the heat requirement of such room area.

The specific nature of the invention as well as other objects and advantages thereof will become apparent to those skilled in the art from the following detailed description of the annexed sheets of drawings which, by way of preferred example only, illustrate two specific embodiments of the invention.

In the drawings:

Figure 2 is a vertical sectional view through the heat insulated boiler of the system of Figure 1.

Figure 3 is a schematic perspective view of a heating system embodying a modification of this invention.

As shown on the drawings:

Figure 1:
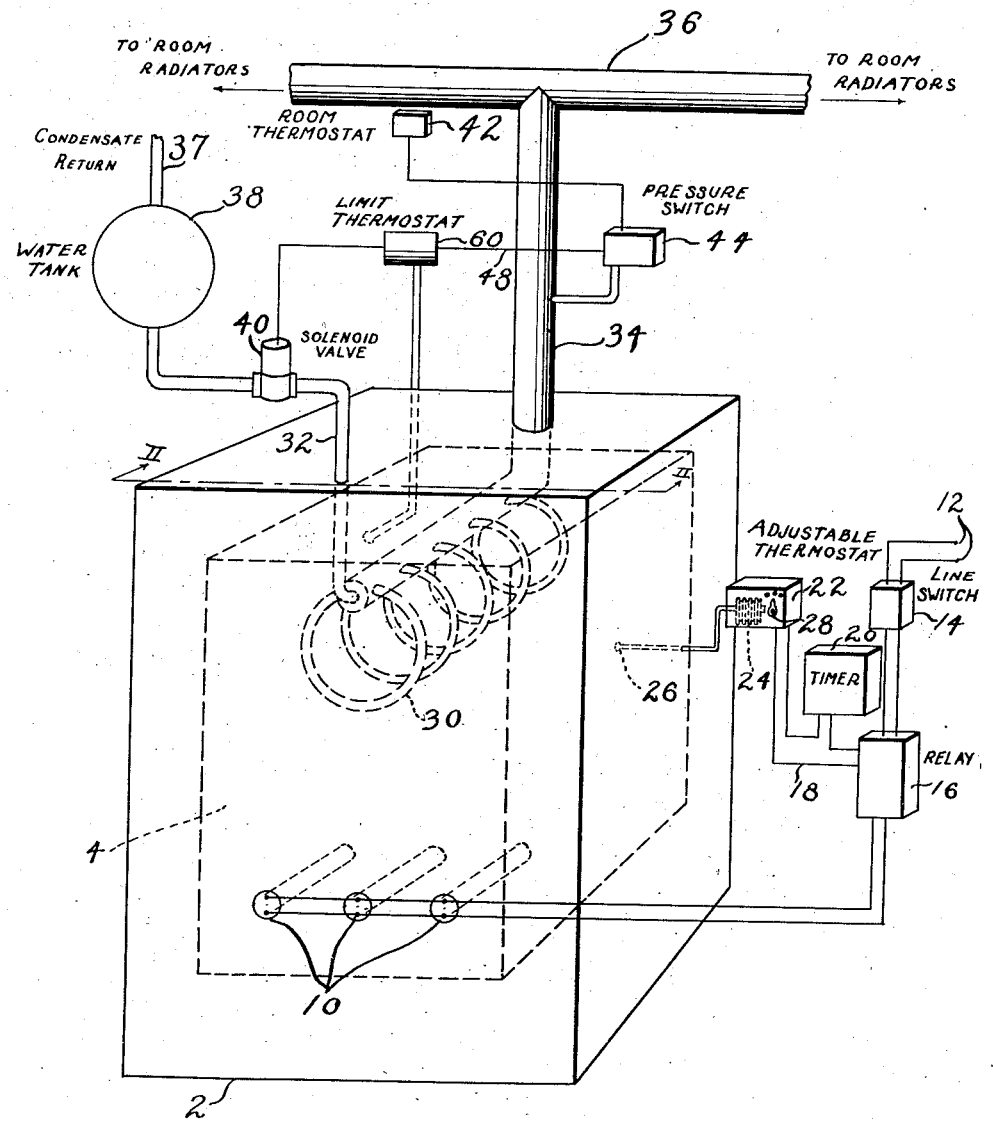
Figure 1 is a schematic perspective view of an electrical heating system embodying this invention.

In accordance with this invention, a boiler 2 of any convenient shape is provided which defines a fluid heating and storing chamber 4 therein. The chamber 4 is surrounded by suitable insulation 6 to insure that the heat losses from such chamber will be minimized, and particularly, that the reduction in temperature of the fluid contents of said chamber 4 due to heat loss through the walls of the boiler 2 will be substantially negligible over a twenty-four hour period. A fixed quantity of high boiling point, heat storing fluid 8 is inserted in the chamber 4 of the boiler 2.

To heat the fluid 8, a plurality of conventional electrical heating elements 10 are provided which are energized from main power terminals 12 through a line switch 14 and the contacts (not shown) of a heater relay 16. The operation of heater relay 16 is controlled by a low voltage control circuit 18 which includes the contacts (not shown) of a timer unit 20 and an adjustable thermostat unit 22. Timer unit 20 may comprise any one of several well known forms of cyclically operating, timing switches and the timer unit 20 is adjusted so as to close its control contacts only during a predetermined portion of its cyclic period which corresponds to the occurrence of off-peak power periods in the generating system. For purposes of example, it may be assumed that timer unit 20 closes its control contacts once each day, throughout the period from 10 p. m. to 7 a. m.

Adjustable thermostat unit 22 may likewise comprise any one of several well known forms which will open its contacts upon the fluid 8 in the chamber 4 of the boiler attaining a predetermined temperature or pressure. For example, adjustable thermostat 22 may include a switch actuating bellows 24 which is in turn energized by the expansion of a suitable fluid disposed in a bulb 26 located in the interior of the chamber 4. Preferably an adjustment of thermostat 22 is provided to vary the temperature at which it will close its control contacts over a substantial range. Such adjusting mechanism may be manually operated by a knob 28. As will be seen, the adjustable thermostat in effect may be operated as a "weather selector."

From the foregoing description, it will be apparent that the fluid 8 in boiler 2 is electrically heated only during off-peak power periods of the generating system and, furthermore, the extent of heating of the fluid 8 is controlled by the particular setting of adjustable thermostat 22. Accordingly, the total heat input to fluid 8 may be selected in accordance with the amount of heat output which it is expected that the boiler 2 will be required to supply during the next twenty-four hour period.

While there are several different types of liquid that may be utilized as the electrically heated fluid 8, this invention preferably contemplates the use of a diphenyl oxide fluid or mixture thereof in view of the markedly superior heat properties of this fluid. Commercially available forms of diphenyl oxide mixtures have a boiling point of 500° F. at atmospheric pressure, and at the elevated temperature of 725° F. produce a vapor pressure on the order of 110 pounds per square inch gauge. In addition, the specific heat of diphenyl oxide fluid is quite large and more nearly approaches that of water than other known forms of high boiling point lower vapor pressure fluids. The low vapor pressure of diphenyl oxide fluid at temperatures above its boiling point are of particular value in the described construction wherein the electrically heated fluid is disposed in a closed chamber to prevent loss thereof, thus avoiding difficulties attendant upon replacement of lost fluid. In the construction embodied in this invention, when the fluid 8 comprises diphenyl oxide fluid, it is preferably heated by the electrical heaters 10 to a selected point in the range from 500 to 700° F. as determined by the particular setting of adjustable thermostat 22.

To effect the transfer of heat from the electrically heated fluid 8 to the room area to be heated, a heat transfer unit is built into boiler 2, preferably disposed in chamber 4 and in direct heat conducting relationship with the electrically heated fluid 8. Thus the heat transfer unit may comprise a flash type, steam boiler 30 having water input connections 32 and steam output connections 34. Output connection 34 is in turn connected to pipe 36 leading to radiators (not shown) disposed in the room area to be heated. Water is supplied to the input connection 32 of flash boiler 30 from a suitable storage tank 38 and the amount of water entering flash boiler 30 is controlled by solenoid valve 40. The control circuit 48 for solenoid valve 40 is such that the valve 40 will admit water to the flash boiler 30 only upon the joint action of a room thermostat 42 and a pressure switch 44. Room thermostat 42 is of conventional type and is disposed in the room area to be heated and closes its electrical contacts whenever the room temperature falls below a pre-selected temperature. Pressure switch 44 is likewise of conventional type and closes its control contacts only when the pressure existing in the outlet connection 34 from flash boiler 30 falls below a predetermined safe value. Suitable piping 37 returns condensate from the room radiators to tank 38.

From the aforedescribed construction, it will be apparent that steam is supplied to the radiators of the room area to be heated in response to the heat demands of the room thermostat; however, the pressure switch 44 effectively prevents the building up of an excessive steam pressure in the output side of the flash boiler 30.

The system operates by abstraction of heat from the electrically heated liquid 8. The temperature of such liquid thus varies from a high point in the range from 500° to 700° F. to a minimum of 215° F. required to assure steam generation in boiler 30. If the heat demands in any 24 hour period exceeds the heat stored in liquid 8 due to unexpected weather conditions, the temperature of the liquid 8 might fall below 215° F. and hence the boiler 30 would fill with water. To prevent such occurrence the normally closed contacts of a minimum temperature limit thermostat 60 are connected in control circuit 48. Thermostat 60 is arranged to open its contacts when the temperature of liquid 8 falls below 215° F.

In operation of the described heating system, the timer unit 20 will, of course, be initially adjusted to limit the energization of the electric heaters 10 to the off-peak power periods of the particular generating system from which the heating system is supplied. The user of the system need only adjust the setting of adjustable thermostat 22, by operation of adjusting knob 28, in accordance with the severity of weather conditions expected during the next twenty-four hour period. During mild weather, the heat input to the electrically heated fluid 8, as represented by the maximum temperature to which such fluid is heated, need not be as great as the heat input during severe cold weather, as the demand for heat from the room area being heated will be substantially reduced. In any event, the heating system is safe and fool-proof inasmuch as the adjustable thermostat 22, even when set for its highest temperature, will effectively interrupt the heating of the electrically heated fluid 8 at a temperature of the fluid corresponding to a safe value of vapor pressure. The system is preferably designed by correlation of the amount of electrically heated fluid 8, the maximum temperature thereof, and the duration of the off-peak power period during which the electrical heaters are energized, so that the total heat input to the electrically heated fluid 8 in any one energization period will be in excess of the expected heat demands of the room area for the most severe cold weather conditions. Proper correlation of the aforementioned variable design factors can also result in a design wherein the total current drawn by the electrical heaters may in certain instances be maintained at a value less than the maximum current capacity of existing wiring in the house being heated.

In Figure 3 there is shown a modification of the heating system of Figure 1 to the extent that the steam generated by a flash boiler unit 30 is utilized to heat a current of air which in turn accomplishes the heating of the room area. A suitable duct 50 directs the current of air to be heated past the coils of a steam-air heat exchanger 52 which is supplied by steam from flash boiler 30 disposed in the interior of chamber 4 of boiler 2. The condensate from the steam-air heat exchanger 52 is returned directly to the water storage tank 38. As in the modification of Figure 1, the input of water from storage tank 38 into the flash boiler 30 is controlled jointly in response to the room thermostat 42 and the pressure switch 44 and stopped by operation of limit thermostat 60.

It is therefore apparent that the described invention provides an improved method and apparatus for electrical heating of homes or similar building structures, and has the particular advantage of permitting such electrical heating to be accomplished during normally off-peak power periods of the generating system. Hence domestic electric heating can be immediately available to the public without requiring an increase in available peak power generating capacity.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A heating system comprising a heat insulated boiler enclosing a fixed volume of high boiling point, heat storing fluid, electrical heater means for heating said fluid, electric circuit means for energizing said heater means including a cyclically operating timing switch permitting energization of said heater means only during a predetermined portion of the cyclic period of said timing switch means, a heat transfer unit disposed in heat conducting relation to said heat storing fluid, means for supplying a second fluid in liquid state to said heat exchanger having a substantially lower boiling point than said heat storing fluid, room heating means supplied by heated second fluid from said heat transfer unit, and means for controlling flow of said second fluid into said heat transfer unit in response to room temperature, the heat input to said heat storing fluid during said predetermined portion of the cyclic period being proportioned to exceed the expected heat demand of said room heating means over the entire cyclic period and to raise the temperature of said first fluid substantially above the boiling point of said second fluid.

2. A heating system comprising a heat insulater boiler defining a fluid storage chamber, a fixed quantity of diphenyl oxide fluid disposed in said storage chamber, electrical heater means for heating said diphenyl oxide fluid, electric circuit means for energizing said heater means including a cyclically operating timing switch, means permitting energization of said heater means only during a predetermined portion of the cyclic period of said timing switch means and means for interrupting the energization of said heating means when said diphenyl oxide fluid reaches a predetermined temperature, a heat transfer unit disposed in heat conducting relation to said diphenyl oxide fluid, means for supplying water to said heat transfer unit, room heating means supplied by heated water from said heat transfer unit, and means for controlling flow of water into said heat transfer unit in response to room temperature, the heat input to said diphenyl oxide fluid during said predetermined portion of the cyclic period being proportioned to exceed expected heat demand of said room heating means over the entire cyclic period.

3. A heating system comprising a heat insulated boiler defining a fluid storing chamber, a fixed volume of diphenyl oxide fluid disposed in said chamber, electrical heater means for heating said diphenyl oxide fluid, electric circuit means for energizing said heater means including a cyclically operating timing switch means permitting energization of said heater means only during a predetermined portion of the cyclic period of said timing switch means and means for interrupting energization of said heating means when said diphenyl oxide fluid reaches a predetermined temperature substantially in excess of the boiling point of water, a flash type steam boiler element disposed in heat conducting relation to said diphenyl oxide fluid, room heating means supplied by steam from said steam boiler, and means for controlling the admission of water into said steam boiler in response to room temperature, the heat input to said diphenyl oxide fluid during said predetermined portion of the cyclic period being proportioned to exceed the expected heat demand of said room heating means over the entire cyclic period.

4. A heating system comprising a heat insulated boiler enclosing a fixed volume of high boiling point, heat storing fluid, electrical heater means for heating said fluid, electric circuit means for energizing said heater means including a cyclically operating timing switch permitting energization of said heater means only during a predetermined portion of the cyclic period of said timing switch means, a heat transfer unit disposed in heat conducting relation to said heat storing fluid, means for supplying a second fluid to said heat exchanger having a substantially lower boiling point than said heat storing fluid, room heating means supplied by heated second fluid from said heat transfer unit, and means for controlling flow of said second fluid into said heat transfer unit in response to room temperature, the heat input to said heat storing fluid during said predetermined portion of the cyclic period being proportioned to exceed the expected heat demand of said room heating means over the entire cyclic period and means for stopping flow of said second fluid to said heat transfer unit when the temperature of said heat storing fluid falls to a predetermined value.

RICHARD B. MARSHALL.

REFERENCES CITED

The following references are of record in the file of this patent:

UNITED STATES PATENTS

| Number | Name | Date |
|---|---|---|
| 884,540 | Thomson | Apr. 14, 1908 |
| 1,560,528 | Baum | Nov. 10, 1925 |
| 1,985,215 | Shivers | Dec. 18, 1934 |
| 2,259,401 | Tucker et al. | Oct. 14, 1941 |
| 2,266,257 | Osterheld | Dec. 16, 1941 |